(12) United States Patent
Karlsson (10) Patent No.: US 6,810,073 B1
(45) Date of Patent: Oct. 26, 2004

(54) METHOD AND SYSTEM FOR INTERFERENCE CANCELLATION USING MULTIPLE FILTER SETS AND NORMALIZED FILTER ADAPTATION

(75) Inventor: Jonas Karlsson, Yokohama (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/522,979

(22) Filed: Mar. 10, 2000

Related U.S. Application Data (60) Provisional application No. 60/170,080, filed on Dec. 9, 1999.

(51) Int. Cl.[7] .............................. H04B 1/69; H04B 7/216
(52) U.S. Cl. ....................... 375/144; 375/141; 370/342
(58) Field of Search ................................. 375/144, 141, 375/140, 130, 143, 146, 147, 148, 346; 370/342, 203, 208, 209, 320, 335, 441, 479

(56) References Cited

U.S. PATENT DOCUMENTS

| | | | | |
|---|---|---|---|---|
| 5,210,770 A | * | 5/1993 | Rice .............................. | 375/1 |
| 5,463,657 A | * | 10/1995 | Rice ............................ | 375/200 |
| 5,930,229 A | * | 7/1999 | Yoshida et al. ............. | 370/203 |
| 6,041,034 A | * | 3/2000 | Fukumasa et al. .......... | 370/203 |
| 6,389,002 B1 | * | 5/2002 | Schilling .................... | 370/342 |
| 6,466,566 B1 | * | 10/2002 | De Gaudenzi et al. ..... | 370/342 |
| 6,529,495 B1 | * | 3/2003 | Aazhang et al. ............ | 370/342 |
| 6,594,248 B1 | * | 7/2003 | Karna et al. ................ | 370/342 |
| 6,658,047 B1 | * | 12/2003 | Komulainen et al. ....... | 375/150 |

FOREIGN PATENT DOCUMENTS

EP  0 936 749 A1  8/1999

OTHER PUBLICATIONS van der Veen, "Blind Subspace–Based Uplink Receiver Algorithm for Wideband CDMA", Fall 1999, IEEE VTS 50th Vehicular Technology Conference, pp. 176–180.

(List continued on next page.)

*Primary Examiner*—Young T. Tse
*Assistant Examiner*—Sam K. Ahn (57) ABSTRACT

A method and system for canceling interference in a code division multiple access (CDMA) network. A transmitted signal is spread using a specific spreading sequence. The signal includes a plurality of symbols having a specific spreading factor that differs from the length of the spreading sequence. The transmitted signal is received and filtered using a plurality of despreading sequences to recover the transmitted signal, wherein each despreading sequence corresponds to a particular part of the spreading sequence and is used to despread a portion of the received signal that was spread using the corresponding part of the spreading sequence. Each despreading sequence is adapted to cancel interference caused by other signals, wherein such interference is associated with the part of the spreading sequence that corresponds to the despreading sequence.

10 Claims, 4 Drawing Sheets

OTHER PUBLICATIONS

Heikkila, et al., "Interference Suppression in CDMA Downlink Through Adaptive Channel Equilization", Fall 1999, IEEE VTS 50th Vehicular Technology Conference, pp. 978–982.

EPO, Standard Search Report, Nov. 3, 2000.

Zečević, et al.; "Blind Adaptation Algorithms for Direct–Sequence Spread–Spectrum CDMA Single–User; Detection"; *Proc. VTC '97*; pp. 2133–2137; May 1997.

Mangalvedhe, et al.; "Blind CDMA Interference Rejection in Multipath Channels"; *Proc. VTC '97*, pp. 21–25; May 1997.

Varanasi, et al.; "Multistage Detection in Asynchronous Code–Division Multiple–Access Communications" *IEEE Trans. Commun.*, vol. 38, No. 4, pp. 509–519; Apr. 1990.

Chaudry, et al.; "Performance of a Dual–Rate DS–CDMA–DFE in an Overlaid Cellular System"; *IEEE Trans. Veh. Technol*, vol. 48, No. 3, pp. 683–695; May 1999.

van der Veen, "Blind Subspace–Based Uplink Receiver Algorithm for Wideband CDMA", Fall 1999, IEEE VTS 50th Vehicular Technology Conference, pp. 176–180.

Heikkila, et al., "Interference Suppression in CDMA Downlink Through Adaptive Channel Equilization", Fall 1999, IEEE VTS 50th Vehicular Technology Conference, pp. 978–982.

EPO, Standard Search Report, Nov. 3, 2000.

* cited by examiner

METHOD AND SYSTEM FOR INTERFERENCE CANCELLATION USING MULTIPLE FILTER SETS AND NORMALIZED FILTER ADAPTATION

CROSS REFERENCE TO RELATED PROVISIONAL APPLICATION

This patent application claims the benefit of priority from, and incorporates by reference the entire disclosure of co-pending U.S. Provisional Patent Application Ser. No. 60/170,080 filed on Dec. 9, 1999.

BACKGROUND OF THE INVENTION

1. Technical Field of the Invention

The present invention relates in general to Code Division Multiple Access (CDMA) communications in cellular radio communications systems, and in particular to interference cancellation in multiple. access communications systems.

2. Description of Related Art

To enable simultaneous communications by multiple users of a cellular system, some type of multiple access technique must be used. In the past, most cellular systems have used either Frequency Division Multiple Access (FDMA), wherein each active call is allocated to a specific frequency, or Time Division Multiple Access (TDMA), wherein each user is allocated a particular time slot and frequency. For the third generation of cellular systems, however, Code Division Multiple Access (CDMA) has been selected as the primary multiple access technique. In particular, Wide-band CDMA (WCDMA) will be used in the majority of the third generation systems.

In CDMA systems, a number of users are allocated to the same frequency. To distinguish among signals for different users, each user is assigned a pseudo-noise spreading sequence, which a transmitter uses to spread the narrow-band information signal to a wide-band signal. To detect a CDMA signal, a conventional receiver despreads the received signal using the same spreading sequence that was used by the transmitter. This despreading concentrates the wide-band signal back to a narrow-band signal. Because the wide-band signal includes information for multiple users, however, the other information signals contained in the wide-band signal tend to interfere with the quality of the despread signal for a particular user. As a result, some form of interference cancellation is typically used to improve performance.

One type of interference cancellation uses knowledge of the spreading codes for all of the various users as well as estimated values of the channel characteristics and data symbols for all of the interfering signals. This type of interference cancellation can be implemented using multi-user detection algorithms, such as parallel subtractive interference cancellation. Multi-user detectors are most frequently found in the base stations of cellular systems because all of the required information is generally available in the base stations.

A second type of interference cancellation can be implemented using single-user detectors, which do not have knowledge of the actual spreading sequences used for interfering signals. Only the modulation method and spreading factor are assumed to be known. Single-user detectors are most frequently found in mobile stations because detailed information about the spreading codes or data symbols of the interfering signals is not typically available to the mobile stations. Moreover, single-user detectors are appropriate for mobile stations because they are generally less complex, in terms of the amount of processing resources needed, than multi-user detectors. Because of this reduced complexity, which makes single-user detectors easier to implement, it is sometimes desirable to use single-user detectors in the base stations as well. Interference cancellation in single-user detectors is based on adaptive algorithms that utilize the cyclo-stationary property introduced by the use of short spreading sequences. Accordingly, these adaptive single-user interference cancellation algorithms can effectively cancel interference without knowing the spreading sequences of the interfering signals.

In existing CDMA systems, the short spreading sequence has a periodicity equal to the symbol time. In other words, the length of the spreading sequence is varied to match the spreading factor. Under the WCDMA standard, however, the short spreading sequences, or scrambling codes, have a fixed length of 256 chips regardless of the spreading factor used to transmit information. Thus, the length of the spreading sequence is only equal to the symbol time when the spreading factor of the data symbols is 256. If the spreading factor is lower (i.e., the data rate is higher), the cyclo-stationary property of the interfering signals is partially destroyed. As a result, existing single-user interference cancellation techniques are not effective in connection with communications using the WCDMA standard.

Moreover, users in the WCDMA environment can be multi-rate users (i.e., the spreading factor for such users can change frequently depending upon the type of application, channel quality, and the like). At any given time, however, different users in a WCDMA system are not necessarily using the same spreading factor. Consequently, interfering signals from other users might have different spreading factors than the user of interest. These problems can further reduce the effectiveness of conventional interference cancellation techniques in the WCDMA environment.

Another problem with many existing adaptive interference cancellation techniques is that they are used to both adapt the receiver to cancel interference and to follow the variations of the radio channel. Because fading on the radio channel can occur very quickly relative to changes in the interfering signals, the adaptation of these interference cancellation techniques often has difficulty following the radio channel variations. Moreover, in addition to handling fading, the adaptive receiver must be able to receive and process signals from multiple antennas and signals propagated through multi-path channels.

There is a need, therefore, for a system and method for canceling interference when the spreading factor used for a particular transmission differs from the length of the short scrambling code for that transmission. The system and method should also be capable of processing transmission signals that are received on multiple antennas and from multiple propagation paths. Furthermore, the system and method would also enable the interference cancellation to adapt to relatively fast variations in the radio channel and to the comparatively slower variations in interference caused by other users' signals. Preferably, the system and method would account for changes in a user's own spreading factor and would provide effective interference cancellation when the spreading factor of interfering users differs from the user's own spreading factor.

SUMMARY OF THE INVENTION

The present invention comprises a method and system for canceling interference in a code division multiple access (CDMA) transmission. In one aspect of the invention, multiple filter sets are used to recover a signal encoded in the transmission, wherein the signal has a spreading factor that differs from the length of a spreading sequence used to encode the signal. In another aspect of the invention, the filter or filters used to recover a signal encoded in the transmission are adapted using a normalized adaptation procedure.

In accordance with one embodiment of the invention, there is provided a method in which a signal encoded in a CDMA transmission is transmitted on a particular channel. The signal includes a plurality of symbols, each having an associated spreading factor, and is spread using a particular spreading sequence. In this embodiment, the length of the spreading sequence differs from the spreading factor associated with at least one of the symbols. Upon receiving the CDMA transmission, it is filtered using a number of despreading sequences to recover the encoded signal. Each of the despreading sequences corresponds to a particular portion of the spreading sequence. Accordingly, each symbol in the received CDMA transmission is despread using one of the despreading sequences that corresponds to the portion of the spreading sequence that was used to spread the symbol. Each despreading sequence is further adapted to cancel interference associated with its corresponding portion of the spreading sequence. Generally, such interference is caused by other signals encoded in the CDMA transmission. Preferably, the adaptation step is performed after each filtering operation to generate an updated despreading sequence for use in the next filtering operation.

In accordance with another embodiment of the invention, interference cancellation is implemented in a system that includes one or more antennas for receiving a CDMA transmission that includes a signal encoded by a particular spreading sequence. The system includes an interference cancellation adaptation unit for adapting each of a plurality of despreading vectors for purposes of canceling interference in the received CDMA transmission. In addition, the system includes one or more filtering units for despreading the received CDMA transmission using the adapted despreading vectors to recover the encoded signal. Each filtering unit comprises a plurality of despreading filters, each of which uses one of the adapted despreading vectors to despread a portion of received CDMA transmission. In particular, the specific adapted despreading vector that is used is the one that corresponds to the part of the spreading sequence used to encode the signal.

In accordance with another embodiment of the invention, a CDMA transmission, in which a signal is encoded using a particular spreading sequence, is transmitted on a specific channel. The CDMA transmission is received and filtered using at least one despreading sequence to recover the signal. Subsequently, the at least one despreading sequence is adapted for purposes of canceling interference caused by other signals in the CDMA transmission. The adapted despreading sequences are further normalized to generate despreading sequences for use in a subsequent filtering step.

As an additional alternative, an error vector can be calculated for each despreading sequence for use in adapting the despreading sequences. Preferably, each such error vector is normalized and then used to calculate the corresponding adapted despreading sequence. Furthermore, the despreading sequences can also be adapted to account for radio channel variations, wherein the adaptation is performed according to an amount of energy and a phase associated with portions of the received CDMA transmission.

In yet another embodiment, there is provided an interference cancellation system having at least one antenna for receiving a CDMA transmission that includes therein a signal encoded by a spreading sequence. The system includes an interference cancellation unit for adapting at least one despreading vector to cancel interference in the received CDMA transmission. The interference cancellation unit also normalizes the adapted despreading sequences to generate updated despreading sequences for use in subsequent filtering. The system further includes one or more filtering units for despreading the received CDMA transmission using the normalized, adapted despreading vectors to recover the encoded signal.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
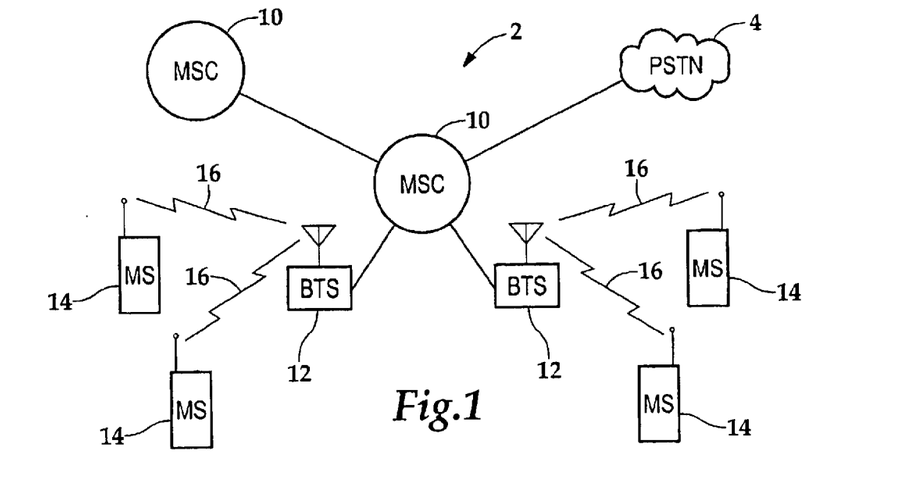
FIG. 1 is a block diagram of a mobile telecommunications network in which the present invention can be implemented.

Reference is now made to the Drawings wherein like reference characters denote like or similar parts throughout the various Figures. Referring now to FIG. 1, there is illustrated a block diagram of a mobile telecommunications network 2 in which the present invention can be implemented. The network 2 includes a mobile switching center (MSC) 10 that serves a particular area. The MSC 10 generally controls cellular communications within its serving area and also routes call connections to other MSCs 10 in the network 2 or to external networks such as a public switched telephone network 4. In connection with its control function, the MSC 10 oversees a plurality of base transceiver stations (BTSs) 12 and routes calls involving a particular mobile station (MS) 14 to and from the base transceiver station 12 that serves the cell where that mobile station 14 is currently located.

Communications between each base transceiver station 12 and a plurality of mobile stations 14 are conducted via an air interface 16. Under the WCDMA standard, communications between a base transceiver station 12 and multiple mobile stations 14 are simultaneously conducted on the same bandwidth using spreading codes that are unique for each mobile station 14. As a result, however, the quality of signals between the base transceiver station 12 and a particular mobile station 14 is somewhat diminished by the interference of signals with other mobile stations 14.

Figure 2:
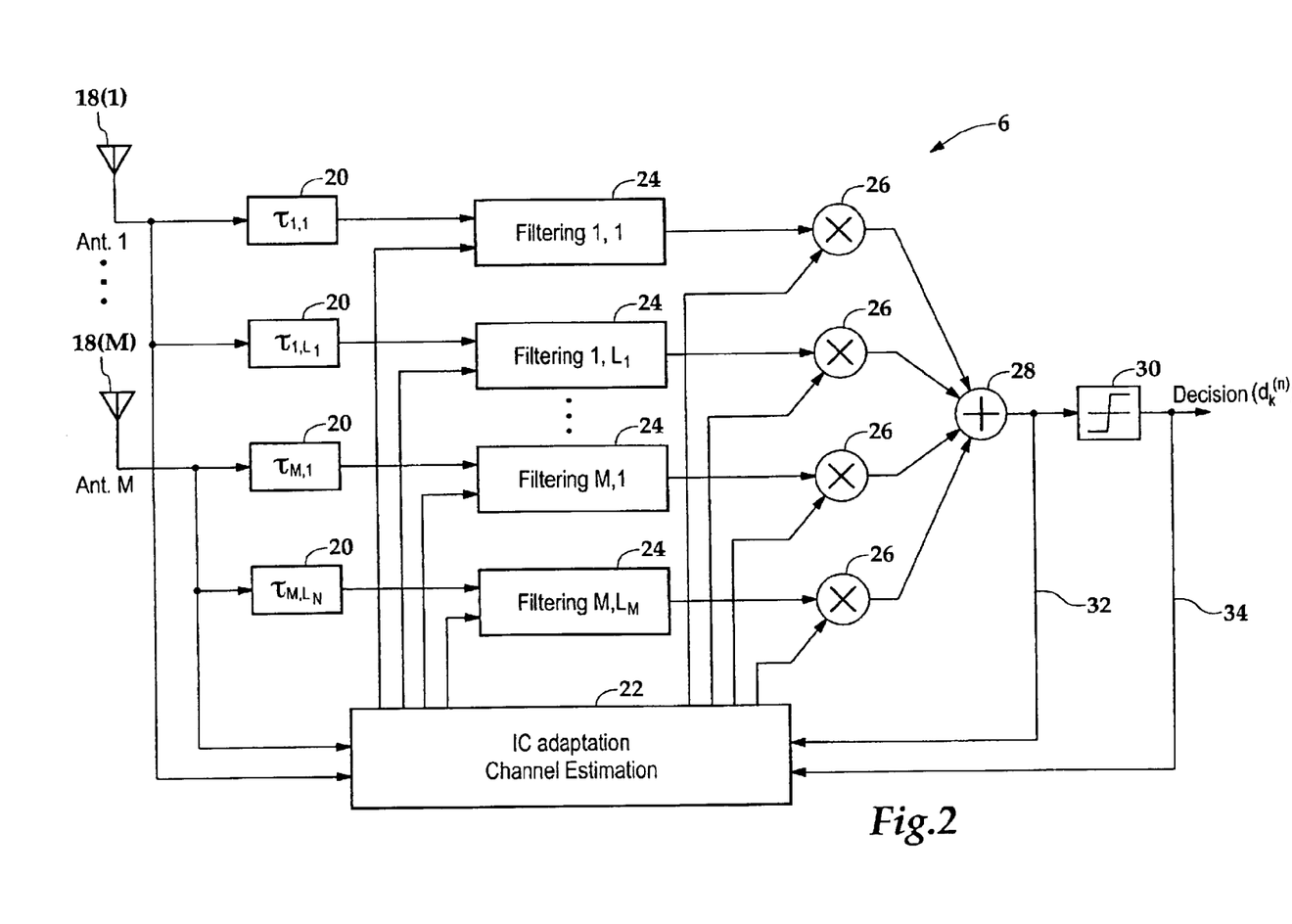
FIG. 2 is a block diagram of a portion of a WCDMA receiver used for adaptive interference cancellation on received signals.

Referring now to FIG. 2, there is illustrated a block diagram of a portion of a WCDMA receiver 6 used for adaptive interference cancellation on received signals. The receiver 6 can be located either in a base transceiver station 12 or in a mobile station 14. In accordance with WCDMA standards, however, short scrambling codes are generally only used in the uplink direction. As a result, adaptive single-user interference cancellation based on the cyclo-stationary properties of the short scrambling codes will most frequently be implemented in the base stations of a WCDMA system.

By using adaptive single-user interference cancellation algorithms, the receiver 6 can cancel interference for each user without interacting with the detection of other users in the system. As a result, interference cancellation in accordance with the present invention can be implemented in a modular way without requiring intercommunication between receivers 6 or between the detection of different users' signals, which simplifies the service, maintenance, and redundancy requirements for the system. Moreover, for interference cancellation in the base stations, these benefits make it easy to gradually upgrade base stations that do not have interference cancellation capabilities to a fully functional interference cancellation base station. In particular, all of the receiver boards in such base stations do not need to be changed at once, and there is no need for additional inter-board communications (i.e., the same backplane can be used). Accordingly, the use of the interference cancellation techniques of the present invention can increase the capacity of base stations, increase the range of base stations, and/or permit the use of lower output power in the mobile terminals.

Returning now to the structure of the receiver 6, the receiver 6 can include one or more antennas 18 that each receive a transmitted signal. When multiple antennas 18 are used, the signals that are received by each antenna 18 can have different propagation delays. In addition, multi-path propagation in the radio environment results in each antenna 18 receiving a plurality of rays. Accordingly, each ray at each antenna 18 should be processed separately. A searcher/tracker unit (not shown) in the receiver 6 identifies and selects the strongest rays received by each antenna 18 and calculates a time delay for each individual ray.

Each time delay from the searcher/tracker unit is used by a corresponding time delay unit 20 to temporally align all of the received rays. The received signals from the antennas 18 are also provided to an interference cancellation (IC) adaptation and channel estimation unit 22, which adapts the despreading vectors to cancel interference and generates channel compensation values to account for variations in the radio channel. To maximize performance, the interference cancellation adaptation is performed relatively slowly because of the slow changes in interference, while the channel compensation values are adapted quickly because of the relatively rapid changes in the radio channel.

The adapted despreading vectors are provided to a corresponding filtering block 24 for each ray. The filtering blocks 24 function to multiply the time-delayed signal rays by the adapted despreading vectors. The outputs of the filtering blocks 24 are further filtered by multiplying them by the channel compensation values at multipliers 26, and the filtered signals for each ray of each antenna are summed at an adder 28. The summed signals are processed by a decision block 30 to generate decision values for the detected signal (e.g., by determining whether each received symbol represents a "0" or a "1"). In addition, the summed signals and the detected signal are provided to the IC adaptation and channel estimation unit 22 by feedback loops 32 and 34 for use in subsequent interference cancellation and radio channel adaptations.

Mathematically, the transmitted radio signal received by antenna m can be represented by:

$$r_m(t) = \sum_{k=1}^{K} \sum_{n=0}^{N_k-1} \sum_{l=1}^{L_k} b_k^{(n)} c_{k,l,m}^{(n)} s_k^{(n)}(t - nT_k - \tau_{k,l,m}) + n_m(t), \quad (1)$$

where K is the number of users, $N_k$ is the number of symbols transmitted by user k, $L_k$ is the number of rays received from user k, $b_k^{(n)}$ are the transmitted symbols, $C_{k,l,m}^{(n)}$ is the complex channel coefficient, $s_k^{(n)}(t)$ is the spreading sequence for user k's nth symbol (wherein the duration of the spreading sequence is $T_k$), $T_k$ is the symbol time of user k, $\tau_{k,l,m}$ is the time delay of the rays, and $n_m(t)$ is the noise received by the mth antenna 18 as a function of time.

The time delay blocks 20 generate a vector $r_{k,l,m}^{(n)}$ that contains the time aligned samples corresponding to user k's nth symbol, which consists of $SF_k$ chips. In the case of chip-rate sampling (i.e., where the received signal is sampled once for each chip), the ith element (wherein $SF_k$ is the spreading factor for user k and i=0, ..., $(SF_k-1)$) in the vector $r_{k,l,m}^{(n)}$ is $r_m(nT_k+\tau_{k,l,m}+T_c i)$, where $T_c$ is the chip period. Thus, the symbol time for user k is $T_k=SF_k * T_c$. The IC adaptation and channel estimation unit 22 provides filtering vectors $w_{k,l,m}^{(n)}$ to the filtering blocks 24 and channel estimates $\hat{C}_{k,l,m}^{(n)}$ to the multipliers 26 for user k. The receiver 6 then generates a detected signal $d_k^{(n)}$ given by:

$$d_k^{(n)} = \sum_{m=1}^{M} \sum_{l=1}^{L_k} \hat{c}_{k,l,m}^{(n)H} w_{k,l,m}^{(n)H} r_{k,l,m}^{(n)} \quad (2)$$

where $(\bullet)^H$ is the complex conjugate matrix transpose operation (i.e., $\hat{C}_{k,l,m}^{(n)H}$ is the complex conjugate matrix transpose of $\hat{C}_{k,l,m}^{(n)}$ and $W_{k,l,m}^{(n)H}$ is the complex conjugate matrix transpose of $W_{k,l,m}^{(n)}$). In the case of BPSK modulation, the final decision on the detected signal has the sign of the real part of the decision variable $d_k^{(n)}$.

To calculate the channel estimates $\hat{C}_{k,l,m}^{(n)}$ many different methods are known in the art. In a preferred embodiment, the channel estimates are adapted to account for radio channel variations in accordance with an amplitude and a phase associated with portions of the received radio transmission. In addition, many different methods are available to calculate the filtering vectors $w_{k,l,m}^{(n)}$. Preferably, however, the new filtering vector is calculated based on the previous filtering vector and other information such that:

$$W_{k,l,m}^{(n)} = f(W_{k,l,m}^{(n-1)}). \quad (3)$$

This is possible because, for each user k, the spreading sequence $s_k^{(n)}(t)$ is the same for all symbols n, assuming the short spreading sequence has a periodicity equal to the symbol time.

Figure 3:
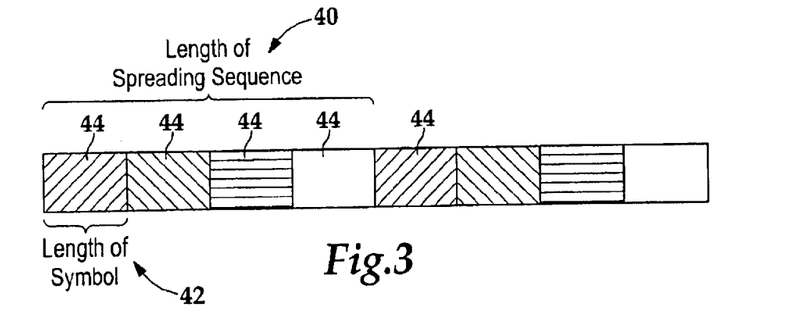
FIG. 3 is a schematic example of a situation where the spreading factor is lower than the length of the spreading sequence.

In the case of a WCDMA receiver 6, however, this assumption does not always hold. As mentioned above, the short spreading sequences have a fixed length of 256 chips regardless of the spreading factor used to transmit information. Even though the symbol-wise cyclo-stationary property will be partly destroyed in cases where the spreading factor differs from the length of the spreading sequence, other periods of cyclo-stationarity will still exist. Referring now to FIG. 3, there is illustrated a schematic example of a situation where the spreading factor 42 is lower than the length of the spreading sequence 40. In particular, the spreading factor in this case is 64 (i.e., the spreading factor is four times lower than the length of the spreading sequence). As a result, every fourth symbol 44 is spread using the same portion of the spreading sequence.

In accordance with the present invention, four independent adaptation filters are used to process the symbols 44. In other words, the received symbols 44 can be grouped into four different sets (i.e., in Set 1, n=0, 4, 8, 12, 16, . . . ; in Set 2, n=1, 5, 9, 13, 17, . . . ; in Set 3, n=2, 6, 10, 14, 18, . . . ; and in Set 4, n=3, 7, 11, 15, 19, . . . ; where n is the time index for the symbols). Each set then has a corresponding adaptation filter that is used for canceling interference on the symbols in that set.

Although the example depicted in FIG. 3 uses a spreading factor that is four times lower than the length of the spreading sequence, other spreading factors can also be used. Accordingly, if the length of the spreading sequence 40 is denoted by SFC (in the WCDMA standard, SFC=256) and if the spreading factor for user k is $SFD_k$, the filtering vector at time n (i.e., $W_{k,l,m}^{(n)}$) is calculated based on the filtering vector at time n-($SFC/SFD_k$) (i.e., $W_{k,l,m}^{(n-(SFC/SFD_k))}$) and other information, such that:

$$W_{k,l,m}^{(n)} = f(W_{k,l,m}^{(n-(SFC/SFD_k))}). \tag{4}$$

Generally, $SFC/SFD_k$ is assumed to be an integer number. Thus, the WCDMA receiver 6 will have $SFC/SFD_k$ number of filtering or despreading vectors that are updated independently to account for the situation in which the spreading factor 42 differs from the length of the spreading sequence 40.

However, simply having one set of filters for such a situation is not always sufficient. In many cases, users can change spreading factors frequently. For example, the spreading factor might be different for different services or might change as a result of variations in the radio channel quality. In accordance with another aspect of the invention, the number of adaptation filters used in the receiver 6 change when the user changes spreading factors. Accordingly, a separate set of filters is maintained for each different spreading factor that is used by the user. For example, a set of four adaptation filters is maintained for use when $SFC/SFD_k=4$, while a set of eight adaptation filters is maintained for use when $SFC/SFD_k=8$.

Figure 4:
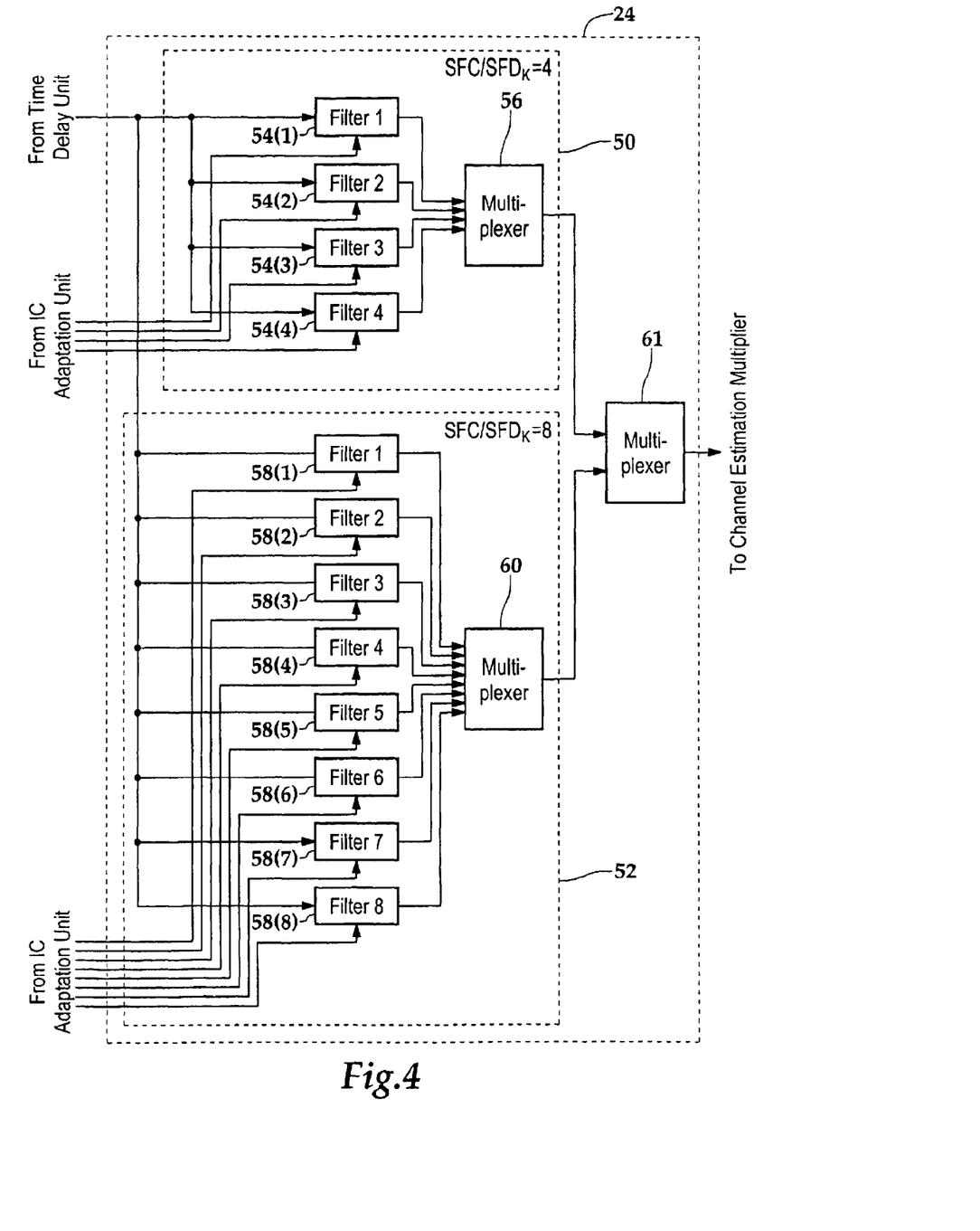
FIG. 4 is a block diagram of an example of a filtering block of FIG. 2 that includes multiple filter sets for use with different spreading factors.

Referring now to FIG. 4, there is illustrated a block diagram of an example of a filtering block 24 of FIG. 2 that includes multiple filter sets for use with different spreading factors. A first filter set 50 is designed for use when $SFC/SFD_k=4$. The first filter set 50 includes four adaptation filters 54(1)–54(4) that correspond to four different parts of the spreading sequence. Each adaptation filter 54 receives from the IC adaptation unit 22 an adaptation vector that is used for despreading the set of symbols corresponding to that portion of the spreading sequence. In addition, the adaptation filters 54 receive the appropriate time-delayed signal ray from a time delay unit 20, which is then filtered using the received adaptation vectors. The outputs of the adaptation filters 54 are then sequentially combined by an adaptation filter multiplexer 56, and the combined output is sent via a filter set multiplexer 61 to a channel estimation multiplier 26 for that ray.

Similarly, a second filter set 52 is designed for use when $SFC/SFD_k=8$. The second filter set 52 includes eight adaptation filters 58(1)–58(8) that correspond to eight different parts of the spreading sequence. Each adaptation filter 58 receives from the IC adaptation unit 22 an adaptation vector that is used for despreading the set of symbols corresponding to that portion of the spreading sequence. In addition, the adaptation filters 58 receive the appropriate time-delayed signal ray from a time delay unit 20, which is then filtered using the received adaptation vectors. The outputs of the adaptation filters 58 are then sequentially combined by an adaptation filter multiplexer 60, and the combined output is sent via the filter set multiplexer 61 to a channel estimation multiplier 26 for that ray. Although not depicted in the Figure, the filtering block 24 can include other sets of filters for supporting interference cancellation in connection with other spreading factors. Accordingly, separate filter sets can be maintained for each of a particular user's different spreading factors. In any event, the filter set multiplexer 61 selects, at any given time, the signal from only one of the adaptation filter multiplexers 56 and 60 depending on the current value of $SFC/SFD_k$. Thus, the filter set multiplexer 61 selects the signal from the adaptation filter multiplexer 56 for the first filter set 50 when $SFC/SFD_k=4$ and the signal from the adaptation filter multiplexer 60 for the second filter set 52 when $SFC/SFD_k=8$.

In another embodiment of the invention, if the number of spreading factors that are used by a particular user is large, the number of filter sets can be reduced by sharing filter sets among spreading factors that are close to each other. This reduction can help reduce the complexity of the interference cancellation processing and can help avoid a situation in which the convergence time becomes too long. For example, a set of four adaptation filters, each corresponding to one quarter of the spreading sequence, might be used both when $SFC/SFD_k=2$ and when $SFC/SFD_k=4$, while a set of sixteen adaptation filters, each corresponding to one sixteenth of the spreading sequence, might be used both when $SFC/SFD_k=8$ and when $SFC/SFD_k=16$. As a result, only two filter sets would be needed in this example instead of four.

Figure 5:
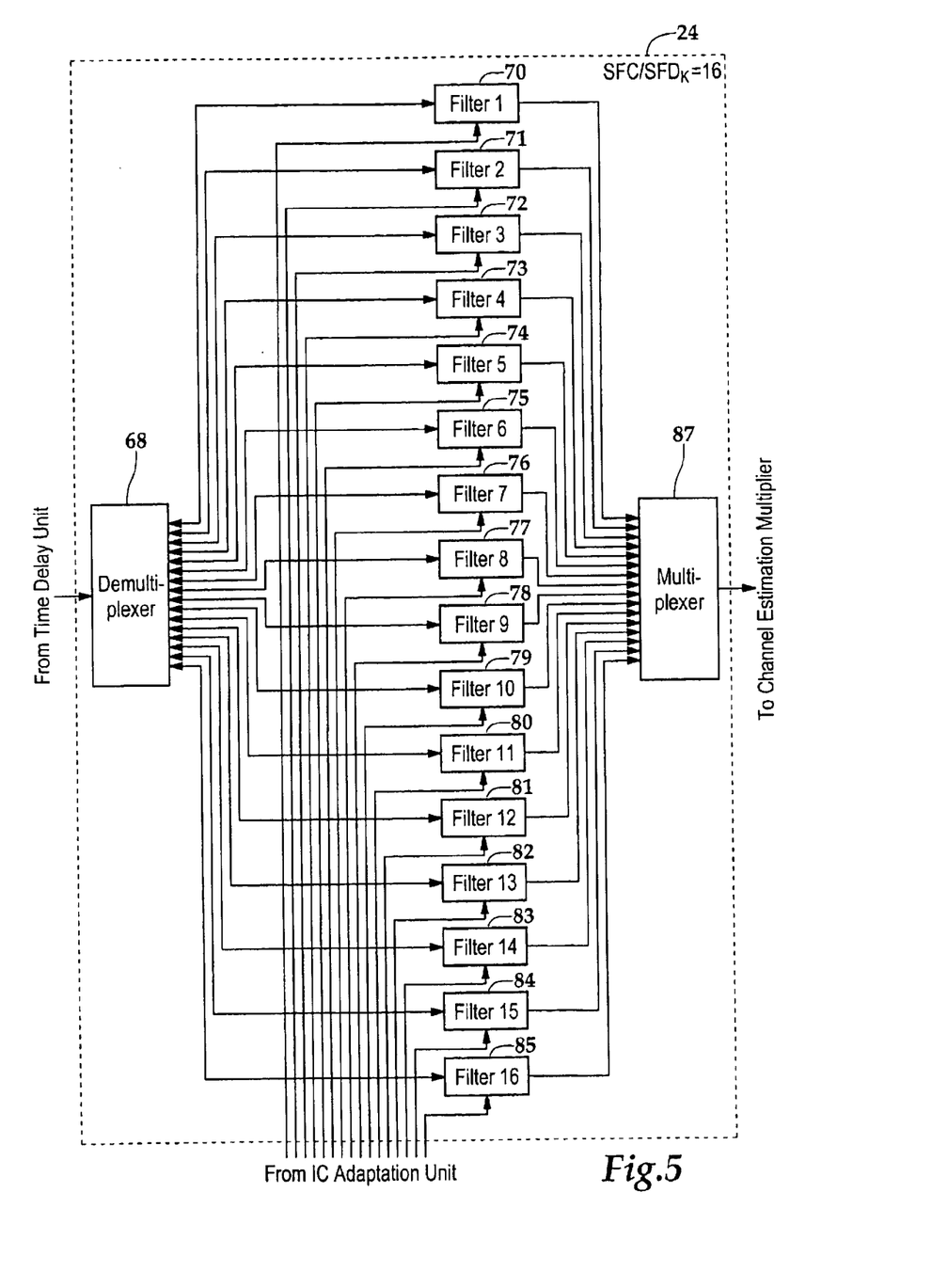
FIG. 5 is a block diagram of an example of a filtering block of FIG. 2 that includes a single, shared filter set for use with multiple different spreading factors.

Referring now to FIG. 5, there is illustrated a block diagram of an example of a filtering block 24 of FIG. 2 that includes a single, shared filter set for use with multiple different spreading factors. The filtering block 24 includes sixteen adaptation filters 70–85, each corresponding to one sixteenth of the spreading sequence. These filters, for example, can be used both when $SFC/SFD_k=8$ and when $SFC/SFD_k=16$. Each adaptation filter 70–85 receives from the IC adaptation unit 22 an adaptation vector that is used for despreading the set of symbols corresponding to that portion of the spreading sequence. In addition, the adaptation filters 70–85 receive the appropriate time-delayed signal ray from a time delay unit 20 via a de-multiplexer 68. The de-multiplexer 68 serves to separate the ray into sequential segments that each correspond to a particular part of the spreading sequence. The de-multiplexer 68 then sends each segment to the corresponding adaptation filter 70–85 for that part of the spreading sequence. Each adaptation filter 70–85 filters the received time-delayed signal ray using the received adaptation vectors for the corresponding part of the spreading sequence. Thus, each of the adaptation filters 70–85 filters one symbol when $SFC/SFD_k=16$ and half a symbol when $SFC/SFD_k=8$. The outputs of the adaptation filters 70–85 are then sequentially combined by a multiplexer 87, and the combined output is sent to a channel estimation multiplier 26 for the ray.

Although the adaptation filters 70–85 are described as being used when $SFC/SFD_k=8$ and when $SFC/SFD_k=16$, the same adaptation filters 70–85 can also be used for other values of $SFC/SFD_k$, such as $SFC/SFD_k=1$, 2, or 4. The performance of the adaptative filtering tends to deteriorate, however, as the value of $SFC/SFD_k$ becomes much smaller than the number of filters in the filter set. Accordingly, when filter sets are shared among different spreading factors, each particular filter set is preferably only shared with spreading factors that are close to the optimum spreading factor for that filter set (e.g., wherein the optimum spreading factor is SFC/the number of adaptation filters; thus, for a filter set that includes sixteen adaptation filters, the optimum spreading factor is 256/16=16).

Figure 6:
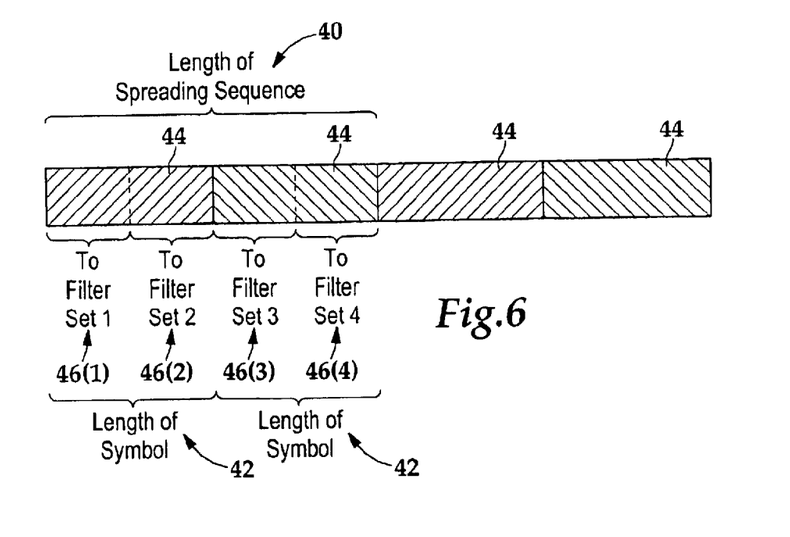
FIG. 6 is a schematic example of a situation in which the spreading factor is two times lower than the length of the spreading sequence, but the symbols are despread using a set of four filters.

Referring now to FIG. 6, there is illustrated a schematic example of a situation where the spreading factor 42 is two times lower than the length of the spreading sequence 40, but the symbols are despread using a set of four filters. In this case, each symbol is divided in half, and each half is despread by a different filter 54 (see FIG. 4). Thus, a first half 46(1) of the first symbol 42 is sent to a first filter 54(1); a second half 46(2) of the first symbol 42 is sent to a second filter 54(2); a first half 46(3) of the second symbol 42 is sent to a third filter 54(3); and a second half 46(4) of the second symbol 42 is sent to a fourth filter 54(4). As a result, each filter 54 corresponds to a distinct part of the spreading sequence.

In addition to the possibility of frequent changes in a user's own spreading factor, it is also likely that at least some of the interfering users in the system will be using a different spreading factor than that of the user of interest. Although the receiver 6 of the present invention does not include any separate functionality for handling interfering users' varying spreading factors, the interference cancellation procedures of the present invention should effectively cancel interference even when the spreading factors of the other users differ from the one being used by the user of interest.

In another aspect of the invention, the convergence properties of interference cancellation procedures can be improved. As discussed in connection with FIG. 2, the channel compensation procedures are separated from the interference cancellation filtering. While this separation helps the receiver 6 to better handle rapid fading on the radio channel, it is not always sufficient to obtain a desirable level of convergence for fading radio channels. In accordance with another embodiment of the invention, however, the level of convergence can be improved by placing limitations on the IC adaptation, such as by normalizing the vectors that are used to update the IC filter coefficients.

Typically, the current filter coefficients (i.e., at time t+1) can be determined as a function of a preceding set of filter coefficients (i.e., at time t) such that:

$$W_k(t+1) = W_k(t) + \mu f( ) \quad (5)$$

where the function f( ) is an error function that depends upon the selected method of adaptation and $\mu$ the step size for the selected method of adaptation. In accordance with Griffiths' algorithm, for example, the error function (i.e., f( )=$e_k$(t)) is given by:

$$e_k(t) = S_k(t) - r(t)\tilde{y}_k^H(t) \quad (6)$$

where $$\tilde{y}_k(t) = \frac{1}{h_k^H h_k} w_k^H(t) r(t), \quad (7)$$

and $h_k$ is a complex value that represents a channel estimate for user k. This type of algorithm has problems with convergence on fading radio channels.

By placing some limitations on the updating method, however, the convergence properties of the filter coefficient updating can be improved. In a preferred embodiment, both the error function and the adaptation filter coefficients are normalized. Thus, updating of the filter coefficients can be performed according to the following algorithms:

$$w_{temp} = w_k(t) + \mu \frac{f()}{|f()|}, \text{ and} \quad (8)$$

$$w_k(t+1) = \frac{w_{temp}}{|w_{temp}|}. \quad (9)$$

In the case of a multi-path radio channel and/or multiple receiving antennas 18, the normalization of the error function can be a function of the channel estimates of the different rays. Accordingly, if there are M antennas each receiving L rays, the filter coefficients for antenna m and ray l can be updated as follows:

$$w_{temp,m,l} = w_{m,l}(t) + \mu \frac{|h_{m,l}|^2}{\sum_{x=1}^{M}\sum_{y=1}^{L}|h_{x,y}|^2} \frac{f_{m,l}()}{|f_{m,l}()|}, \text{ and} \quad (10)$$

$$w(t+1) = \frac{w_{temp,m,l}}{|w_{temp,m,l}|}, \quad (11)$$

where $h_{m,l}$ is the channel estimate for antenna m and ray l. As a result, the actual step size is adjusted to the energy of that particular ray. Alternatively, the actual step size can be adjusted in other ways, such as according to the amplitude of the particular ray or any other function of the energy of the ray. Similarly, in the case of a single ray, the normalization of the error function can be a function of an amount of energy associated with the ray.

A number of different adaptation algorithms can be used in accordance with the normalization and/or multiple filter set aspects of the present invention, including the least mean squares (LMS) algorithm, the recursive least squares (RLS) algorithm, and the normalized recursive least squares (NRLS) algorithm. In one preferred embodiment, however, a normalized Griffiths' algorithm is used for updating the despreading vectors. Thus, the error function is given by:

$$e_k(t) = \frac{s_k - r(t)\tilde{y}_k^H(t)}{|s_k - r(t)\tilde{y}_k^H(t)|}, \quad (12)$$

and the despreading vector is adapted according to:

$$w_k(t+1) = \frac{w_k(t) + \mu e_k(t)}{|w_k(t) + \mu e_k(t)|}, \quad (13)$$

where $$\tilde{y}_k(t) = \frac{1}{h_k^H h_k} w_k^H(t) r(t), \quad (14)$$

and, in the case of BPSK modulation, $$\hat{d}_k(t) = \text{sign}(\text{real}(h_k^H \tilde{y}_k(t))). \quad (15)$$

In the receiver 6 of FIG. 2, $\hat{y}_k$(t) represents the output of the adder 28, while $W_k$(t+1) represents the adapted despreading vector generated by the IC adaptation unit 22. In connection with the normalized Griffiths' algorithm, a step size of approximately $\mu$=0.01 is preferred. Ideally, the adaptation of the despreading vectors for all of the rays of all of the antennas is performed jointly. The adaptation is much simpler to perform, however, if it is done separately for each ray.

As will be appreciated by those of ordinary skill in the art, the normalized adaptation algorithms can also be used in connection with one or more sets of filters (i.e., when the spreading factor differs from the length of the spreading sequence). Accordingly, if each value of t corresponds to a transmitted symbol, then updating of the adaptation filters could be accomplished using:

$$w_k(t) = \frac{w_k(t - SFC/SFD_k) + \mu \frac{f()}{|f()|}}{\left| w_k(t - SFC/SFD_k) + \mu \frac{f()}{|f()|} \right|} \quad (16)$$

Although a preferred embodiment of the method and apparatus of the present invention has been illustrated in the accompanying drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for canceling interference in a code division multiple access (CDMA) communication system to recover a signal encoded in a CDMA transmission, comprising the steps of:

transmitting on a particular channel the CDMA transmission having a specific signal encoded therein, said specific signal including a plurality of symbols, each symbol having an associated spreading factor, and said specific signal spread using a particular spreading sequence, wherein the length of the spreading sequence differs from at least one of the associated spreading factors, the spreading sequence comprises a repeating short spreading sequence, and said CDMA transmission includes at least one other signal encoded therein;

receiving the CDMA transmission having the specific signal encoded therein;

filtering the CDMA transmission using a plurality of despreading sequences to recover the specific signal, wherein each of the plurality of despreading sequences corresponds to a particular portion of the spreading sequence and a first subset of the plurality of despreading sequences is associated with a first spreading factor and a second subset of the plurality of despreading sequences is associated with a second spreading factor, wherein said first spreading factor differs from said second spreading factor and wherein the first subset of the despreading sequences consists of a number of despreading sequences equal to a length of the particular spreading sequence divided by the first spreading factor and the second subset of the despreading sequences consists of a number of despreading sequences equal to a length of the particular spreading sequence divided by the second spreading factor, each symbol despread using at least one of the plurality of despreading sequences, said at least one of the plurality of despreading sequences selected for each symbol according to the portion of the spreading sequence used to spread that symbol; and adapting each despreading sequence to cancel interference associated with the portion of the spreading sequence that corresponds to said despreading sequence, said interference caused by the at least one other signal.

2. The method of claim 1, wherein the first subset of the despreading sequences is further associated with a third spreading factor, said third spreading factor different from said first spreading factor, each symbol associated with the third spreading factor despread using the despreading sequences in the first subset of the despreading sequences.

3. The method of claim 1, wherein the step of adapting each despreading sequences further comprises updating each despreading sequence based on a calculated error associated with a prior filtering operation involving said each despreading sequence.

4. The method of claim 3, wherein said prior filtering operation comprises a despreading of a prior symbol in the specific signal using said each despreading sequence.

5. The method of claim 1, further comprising the steps of:

determining at least one channel compensation value associated with the CDMA transmission; and modifying at least one despread symbol using the at least one channel compensation value.

6. The method of claim 1, wherein the step of receiving comprises receiving a plurality of rays of the CDMA transmission and the step of filtering comprises separately filtering each of the plurality of rays.

7. The method of claim 1, wherein the step of adapting comprises normalizing the despreading sequences.

8. The method of claim 7, further comprising the steps of normalizing an error function for each despreading sequence, said error function associated with a prior filtering operation involving said each despreading sequence, and updating said each despreading sequence based on the error function.

9. The method of claim 8, wherein the step of receiving comprises receiving a plurality of rays of the CDMA transmission, the step of filtering comprises separately filtering each of the plurality of rays, the step of adapting comprises separately adapting the despreading sequence for each ray, and the normalization of each error function includes adjusting a step size for said updating based on the energy of each ray.

10. The method of claim 1, wherein said step of adapting each despreading sequence comprises updating the despreading sequence in accordance with Griffiths' algorithm.

* * * * *